United States Patent
Ishikawa et al.

(10) Patent No.: US 7,737,084 B2
(45) Date of Patent: Jun. 15, 2010

(54) IMAGE FADING PREVENTING AGENT, IMAGE FORMING ELEMENT, RECORDING MEDIUM, IMAGE FORMING METHOD AND IMAGE

(75) Inventors: Takayuki Ishikawa, Inba-gun (JP); Takashi Sawada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 11/567,991

(22) Filed: Dec. 7, 2006

(65) Prior Publication Data
US 2007/0093386 A1    Apr. 26, 2007

Related U.S. Application Data

(63) Continuation of application No. PCT/JP2006/311152, filed on May 29, 2006.

(30) Foreign Application Priority Data
May 31, 2005  (JP) .............. 2005-159239

(51) Int. Cl.
B41M 5/035 (2006.01)
B41M 5/50 (2006.01)
(52) U.S. Cl. .......... 503/227; 346/135.1; 428/32.1
(58) Field of Classification Search .......... None
See application file for complete search history.

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 AD |
| 4,248,852 A | 2/1981 | Wakabayashi et al. | 423/626 |
| 5,091,009 A | 2/1992 | Nogami et al. | 106/287.1 |
| 5,221,497 A | 6/1993 | Watanabe et al. | 252/313.2 |
| 5,635,291 A | 6/1997 | Yoshino et al. | 428/304.4 |
| 5,800,916 A | 9/1998 | Yoshino et al. | 428/328 |
| 5,846,647 A | 12/1998 | Yoshino et al. | 428/328 |
| 5,851,654 A | 12/1998 | Yoshino et al. | 428/328 |

(Continued)

FOREIGN PATENT DOCUMENTS

JP    57-44605 B2    9/1982

(Continued)

OTHER PUBLICATIONS

The 22$^{nd}$ Oxidation Reaction Forum, Ehime University, Faculty of Science, Mukai, Ohhaba, et al., pp. 7-10 (with English abstract and partial English translation).

(Continued)

*Primary Examiner*—Bruce H Hess
(74) *Attorney, Agent, or Firm*—Fitzpatrick, Cella, Harper & Scinto (57) ABSTRACT

The invention provides an image fading preventing agent capable of preventing the discoloration/fading of an image formed and stably retaining its image quality over a long period of time, as well as an image forming element, a recording medium, an image forming method and an image using the agent. The image fading preventing agent is used in a region in which an image is formed by a coloring material, and has a functional group to cause intramolecular proton transfer in its molecule. An image is formed by the image forming element, recording medium or image forming method using the agent.

8 Claims, 1 Drawing Sheet

U.S. PATENT DOCUMENTS

| | | | |
|---|---|---|---|
| 5,869,177 A | 2/1999 | Yoshino et al. | 428/328 |
| 5,948,150 A | 9/1999 | Lin et al. | 106/31.13 |
| 5,955,185 A | 9/1999 | Yoshino et al. | 428/304.4 |
| 5,962,124 A | 10/1999 | Yoshino et al. | 428/328 |
| 5,965,252 A | 10/1999 | Santo et al. | 428/329 |
| 6,017,471 A | 1/2000 | MacDonald et al. | 252/600 |
| 6,056,812 A | 5/2000 | Lin et al. | 106/31.47 |
| 6,211,383 B1 | 4/2001 | MacDonald et al. | 548/479 |
| 6,342,289 B1 | 1/2002 | Eguchi et al. | 428/195 |
| 6,387,473 B1 * | 5/2002 | Sismondi et al. | 428/32.34 |
| 6,558,740 B1 | 5/2003 | Santo et al. | 427/146 |
| 6,592,953 B1 * | 7/2003 | Ceruti et al. | 428/32.24 |
| 6,649,661 B2 | 11/2003 | Yoshino et al. | 516/93 |
| 6,848,781 B2 | 2/2005 | Ogino et al. | 347/105 |
| 7,008,671 B2 | 3/2006 | Ishikawa et al. | 427/152 |
| 7,059,715 B2 * | 6/2006 | Taguchi et al. | 347/105 |
| 7,090,719 B2 | 8/2006 | Ishikawa et al. | 106/31.49 |
| 7,144,613 B2 | 12/2006 | Eguchi et al. | 428/32.37 |
| 2004/0048008 A1 | 3/2004 | Yoshino et al. | 428/32.1 |
| 2004/0141036 A1 | 7/2004 | Ishikawa | 347/97 |
| 2005/0007436 A1 | 1/2005 | Ogino et al. | 347/105 |
| 2005/0191446 A1 | 9/2005 | Ishikawa et al. | 428/32.34 |
| 2006/0182906 A1 | 8/2006 | Kamo et al. | 428/32.34 |

FOREIGN PATENT DOCUMENTS

| | | |
|---|---|---|
| JP | 63-215781 | 9/1988 |
| JP | 7-232473 A | 9/1995 |
| JP | 8-132731 A | 5/1996 |
| JP | 9-66664 A | 3/1997 |
| JP | 9-76628 A | 3/1997 |
| JP | 2803134 B2 | 9/1998 |
| JP | 11-502237 | 2/1999 |
| JP | 2881847 B2 | 4/1999 |
| JP | 2000-034433 | 2/2000 |
| JP | 2000-226544 | 8/2000 |
| JP | 2003-094797 | 4/2003 |
| WO | WO 96/22335 | 7/1996 |

OTHER PUBLICATIONS

Inoue et al., Tetrahedron, vol. 41, No. 11, pp. 2177-2181 (1985).

Wasserman et al., Singlet Oxygen (vol. 40 of Organic Chemistry: A series of monographs), pp. iv-ix and 139-171 (1979).

English-language translations of the International Preliminary Report on Patentability and Written Opinion of the International Searching Authority for PCT/JP2006/311152 (5 pages).

Francis Wilkinson and James G. Brummer, "Rate Constants for the Decay and Reactions of the Lowest Electronically Excited Singlet State of Molecular Oxygen in Solution", *Journal of Physical Chemistry Reference Data*, vol. 10, No. 4, pp. 809-999 (1981).

\* cited by examiner

IMAGE FADING PREVENTING AGENT, IMAGE FORMING ELEMENT, RECORDING MEDIUM, IMAGE FORMING METHOD AND IMAGE

This application is a continuation of International Application No. PCT/JP2006/311152 filed on May 29, 2006, which claims the benefit of Japanese Patent Application No. 2005-159239 filed on May 31, 2005.

BACKGROUND OF THE INVENTION

1. Field of the Invention

The present invention relates to an image fading preventing agent, an image forming element, a recording medium, an image forming method and an image using the same.

2. Description of the Related Art

In recent years, the advancement of image forming technology has rapidly progressed, an image quality comparable with that of a silver halide photograph has been achieved even in image forming methods such as a dye sublimation thermal transfer method and an ink-jet method, and such high quality image spreads in the life of the people.

The dye sublimation thermal transfer method is a method in which sublimation coloring materials are used as recording agents, these agents are carried on a base sheet such as a polyester film to provide a thermal image transfer sheet (ink sheet), and various kinds of full-color images are formed on an image receiving sheet (recording medium for thermal transfer) obtained by forming a coloring material receiving region on a transfer printing medium capable of being dyed by the sublimation coloring material, for example, paper, a plastic film or the like. In this case, a blinking thermal head is used as a heating means to transfer many color dots of three colors or more to the image receiving sheet by heating for an extremely short period of time, thereby reproducing a full-color image of an original image with the multi-color color dots. Concerning the image formed in such a manner, an image obtained by using a dye as a sublimation coloring material can be excellent in brightness, transparency, half tone reproduction property and gradation property and having high quality comparable with a full-color silver halide photograph image.

However, the image obtained by using sublimation dyes is generally poor in light fastness compared with an image formed with pigments and involves a problem that the image is fast faded or discolored when it is exposed to direct sunlight. The image also involves a problem that it undergoes discoloration/fading (dark fading) even when it is exposed to no direct sunlight, for example, when it is in a room, placed in a file or kept in a book. These problems of light fastness and dark fading are improved to some extent by adding an ultraviolet light absorber and an antioxidant to a dye receiving layer of the image receiving sheet. However, the above-described conventional technique involves a problem that the effect to protect the dyes by the antioxidant and the like is not effectively achieved and the prevention of discoloration/fading is insufficient, because the antioxidant and the like are uniformly distributed in the whole of the dye receiving layer, while most of the dyes transferred are present in the vicinity of the surface of the receiving layer. There is thus a strong demand for development of a technique capable of effectively protecting the transferred dyes by the antioxidant and the like.

On the other hand, ink-jet recording has been rapidly spread for output apparatus of digital signals from computers, digital cameras, etc. in recent years because it has features of low price of an apparatus itself, low running cost, easy color recording and the like. As for recording inks used for ink-jet printers, there have been proposed various types of inks such as inks obtained by dissolving a dye in an aqueous medium or non-aqueous medium, inks obtained by dispersing a pigment in an aqueous or oil medium, and heat-fusible solid inks. Those obtained by dissolving a dye in an aqueous medium are recently mainly used for such ink and have features of beautiful coloring, high safety for human body and environment, and the like. In recent years in particular, ink-jet printers capable of conducting printing with ease in homes and offices have been spread, and those capable of attaining image quality comparable with that of a silver halide photograph have been developed. However, among coloring materials such as aqueous dyes, there are those poor in light fastness and oxidation resistance. Therefore, an image formed by using such dyes is poor in shelf life compared with the silver halide photograph and particularly involves a problem that its image quality and hue are deteriorated by light or the like with time. In the ink-jet printing, there is also a strong demand for development of a technique capable of effectively protecting the dyes by the antioxidant and the like.

In order to solve such a problem, there have been proposed various solving methods of preventing degradation of dyes. The methods mainly comprise adding an antioxidant, an ultraviolet light absorber and/or the like and providing an overcoat thereof, and proposals have been made as to the kinds of additives, adding methods, properties of the antioxidant, etc.

There are various theories as to the mechanism of fading of coloring materials such as dyes usable in the dye sublimation thermal transfer recording or ink-jet recording. However, it is generally considered as follows. Namely, a coloring material such as a dye becomes in the triplet excited state by light, and excited singlet oxygen is generated by energy transfer between the coloring material in the triplet state and triplet oxygen in the ground state. This singlet oxygen is high in activity and relatively long in life and reacts with the coloring material such as the dye to facilitate oxidation or decomposition, which is considered to form the cause of deterioration of an image.

From such a point of view, there have been known those relating to additives with a singlet oxygen quenching rate $k_Q$ defined as a parameter for a method for selecting a suitable additive, and recording media and recording liquid containing such an additive, or recording methods using the same (Japanese Patent Application Laid-Open No. 2000-226544 (Patent Document 1) and Japanese Patent Application Laid-Open No. 2003-94797 (Patent Document 2).

Patent Document 1 discloses recording liquids for ink-jet printing and recording sheets for ink-jet printing containing a compound having a singlet oxygen quenching rate of $1 \times 10^6$ $dm^3 mol^{-1} s^{-1}$ or more. Patent Document 2 discloses ink-jet recording media using a compound having a singlet oxygen quenching rate of from $1 \times 10^6$ $dm^3 mol^{-1} s^{-1}$ or more to $1 \times 10^9$ $dm^3 mol^{-1} s^{-1}$ or less and a compound having a radical trapping rate $(K_s)$ of from 1 or more to 10,000 or less in combination.

Japanese Patent Application Laid-Open No. 2000-34433 (Patent Document 3) discloses ultraviolet dissipation energy absorbers as additives for improving fading resistance of printed images, and binding amine free radical inhibitors (hindered amine compounds) and reducing agents (hindered phenol and the like) as other additives.

In Journal of Physical Chemistry Reference Data, Vol. 10, No. 4, pp. 809-999 (1981) (Non-patent Document 1), arguments on the results of measurement of the singlet oxygen quenching rate $k_Q$ of various kinds of compounds are made for every solvent.

SUMMARY OF THE INVENTION

The value of the singlet oxygen quenching rate $k_Q$ is mainly measured in a non-aqueous medium (insoluble in water and alcohol) (see Non-patent Document 1). In order to measure the value of the singlet oxygen quenching rate $k_Q$ in a water-soluble solvent (soluble in water and alcohol), it is generally necessary to form a dispersion using sodium dodecylbenzenesulfonate or the like as a dispersant. The value of the singlet oxygen quenching rate $k_Q$ generally varies according to solvents for measurement, and it is known that values in hydrophilic mediums become smaller. For example, according to Non-patent Document 1, the value of the singlet oxygen quenching rate $k_Q$ of DABCO (1,4-diazabicyclo-[2.2.2]octane) described in Examples of Patent Document 1 is $5.2 \times 10^7$ $dm^3mol^{-1}s^{-1}$ in chloroform, which is a non-aqueous solvent, while it is $8.1 \times 10^6$ $dm^3mol^{-1}s^{-1}$ in methanol, which is an aqueous solvent. Ink-jet recording using dyes as coloring materials is conducted under a hydrophilic solvent environment, so that it should be necessary to investigate the singlet oxygen quenching rate $k_Q$ in a water-soluble solvent. However, Patent Document 1 and Document 2 do not at all take this into consideration. It is considered that since the performance of antioxidants (image fading preventing agents) used for coloring materials such as dyes has been high, no problem has been caused without taking into consideration the difference in the value of the singlet oxygen quenching rate due to the difference of a solvent for measurement.

However, in recent years, performance of coloring materials used for the dye sublimation thermal transfer recording or ink-jet recording increasingly becomes higher. With such improvement of the coloring materials, the coloring materials themselves have come to have a singlet oxygen quenching rate of $1 \times 10^8$ $dm^3mol^{-1}s^{-1}$ or higher. This means that the ability of the coloring material to quench singlet oxygen increases. In other words, it means that the coloring material and the image fading preventing agent have competitive relation to each other in the ability to quench singlet oxygen, and hence the image fading preventing agent does not prevent the coloring material from being attacked by singlet oxygen when the selection of the image fading preventing agent is mistaken. Namely, the image fading preventing agents used heretofore come to be insufficient in the ability to quench singlet oxygen, so that there is a strong demand for development of an image fading preventing agent having higher effectiveness.

Such ultraviolet dissipation energy absorbers, binding amine free radical inhibitors (hindered amine compounds) and reducing agents (hindered phenols and the like) as disclosed in Patent Document 3 have been those with which singlet oxygen is quenched by a chemical quenching mechanism (oxidative reaction mechanism). In this chemical quenching mechanism, the image fading preventing agent acts as a so-called sacrificial reagent. Therefore, a compound higher in the ability to quench singlet oxygen has a relation of trade-off to the lastingness of the effect thereof, because such compound is an unstable compound easy to undergo oxidation. More specifically, since such compound is sacrificial, there is nothing for it but to use the image fading preventing agent in a great amount or successively supply the agent to sustain the quenching ability thereof in order to sustain the quenching ability. However, the actual use of the image fading preventing agent in a great amount in the recording medium causes such problems that the transparency of the coloring material receiving region and ink-receiving layer is lowered to encounter difficulty in forming a bright image, and that the deterioration of coloring-material-receptive property and ink absorbency at a half tone or secondary color portion. The action mechanism of a benzotriazole type ultraviolet light absorber as an ultraviolet dissipation energy absorber, which is hydrogen (proton) transfer in the excited state, is disclosed in Patent Document 3. However, the proton transfer acts for developing an ultraviolet light-absorbing function, and thus, against singlet oxygen (the cause of oxidation of the coloring material), such a compound itself is oxidatively decomposed by the singlet oxygen to lose its ability as the ultraviolet light absorber.

Thus, the present inventors have recognized, as a first problem, the fact that the image fading preventing agent is deactivated like a sacrificial reagent as described above and carried out an extensive investigation as to image fading preventing agents having such a mechanism that the effect is maintained with a smaller amount over a long period of time. As a second problem, the present inventors have further recognized that an optimum range of the singlet oxygen quenching rate $k_Q$ in a water-soluble solvent (soluble in water and alcohol) is to be investigated and carried out an extensive investigation.

It is an object of the present invention to provide an image fading preventing agent capable of preventing discoloration and fading (in the description, referred to as "discoloration/fading") of an image formed and of stably retaining its image quality over a long period of time, and also an image forming element, a recording medium and an image forming method using such agent, as well as an image formed thereby.

The present inventors have carried out extensive researches. As a result, it has been found that use of an image fading preventing agent having, as a singlet oxygen quenching mechanism of an image fading preventing agent contained in a recording medium, such a structure as to cause intramolecular proton transfer, in which the number of double bonds forming a path of electron transfer attending on the intramolecular proton transfer is from 1 to 4 and no localized π electron system is contained in its molecule can prevent discoloration/fading over a long period of time and can stably maintain the image quality of an image formed over a long period of time, thus leading to completion of the present invention. Namely, the present invention includes the following aspects.

The present invention provides an image fading preventing agent which is used in a region in which an image is formed by a coloring material and has a functional group to cause intramolecular proton transfer in its molecule.

The present invention provides an image fading preventing agent which brings an action of deactivating singlet oxygen, which forms the cause of an oxidation reaction to a coloring material, by an intramolecular proton transfer mechanism. The present invention provides a recording medium comprising a base material and a coloring material receiving region formed on the base material, wherein the above-described image fading preventing agent is contained in the coloring material receiving region.

The present invention provides an image forming method comprising forming an image on the above-described recording medium by a coloring material.

The present invention provides an image forming element comprising a coloring material and a compound having a functional group, which causes intramolecular proton transfer, in its molecule.

The present invention provides an image comprising a coloring material and a compound having a functional group, which causes intramolecular proton transfer, in its molecule.

According to the present invention, there can be provided an image fading preventing agent capable of preventing discoloration/fading of an image formed on a recording medium and of stably maintaining its image quality over a long period of time, and also an image forming element, a recording medium and an image forming method using the agent, as well as an image formed thereby.

DESCRIPTION OF THE EMBODIMENTS

Image Fading Preventing Agent

The "image fading preventing agent" in the present invention means a compound which protects a coloring material such as a dye from factors to cause deterioration of the coloring material, such as gases and light, and prevents fading of an image when it is present in an ink-receiving layer of a recording medium together with the coloring material contained in an ink composition used for formation of an image. As the image fading preventing agent having such a function, a compound having a structure permitting intramolecular proton transfer is used in the present invention. This image fading preventing agent has an action of deactivating singlet oxygen, which forms the cause of an oxidation reaction to a coloring material, by an intramolecular proton transfer mechanism. For example, a compound having a hydrogen bond in its molecule, such as an anthraquinone derivative or pentavalent phosphoric ester compound, causes such intramolecular proton transfer reactions as shown in the following schemes (a) to (d) by light irradiation. The path of electron transfer attending on the intramolecular proton transfer at that time is indicated by a bold line, and the node of a wave function in an excited state is indicated by a broken line.

(a)

Number of double bonds forming the path of electron transfer attending on the intramolecular proton transfer: 4.

(b)

Number of double bonds forming the path of electron transfer attending on the intramolecular proton transfer: 2.

(c)

Number of double bonds forming the path of electron transfer attending on the intramolecular proton transfer: 2.

(d)

Number of double bonds forming the path of electron transfer attending on the intramolecular proton transfer: 1.

The "intramolecular proton transfer" in the present invention means a phenomenon that an intramolecular resonance formula is reversibly established without inconsistency even when a hydrogen atom transfers in the molecule as shown in the schemes (a) to (d).

The "number of double bonds forming the path of electron transfer attending on the intramolecular proton transfer" in the present invention means the number of double bonds forming a conjugated system (electron transfer path) participating in resonance of a conjugated chain when the molecule forms a tautomer as shown in the schemes (a) to (d) with the intramolecular proton transfer. In order to complete resonance without inconsistency in the molecule, a conjugated system having at least one double bond is required. When the number of double bonds increases, the conjugated chain becomes long and energy and time required for isomerization come to be more increased.

Figure 1:
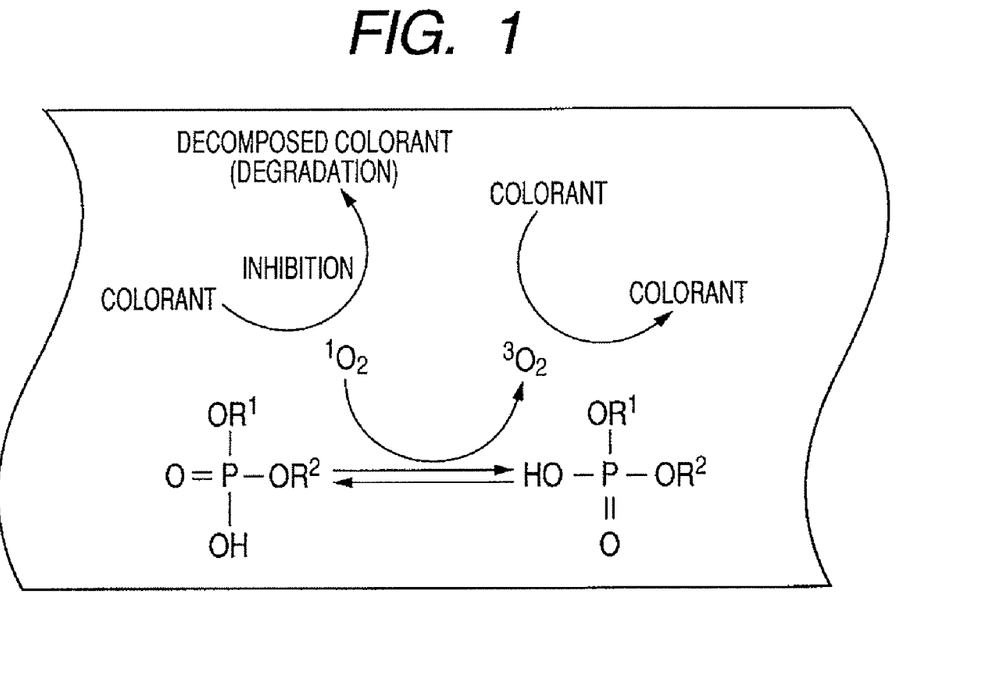
FIG. 1 illustrates a function of preventing degradation of a coloring material by an image fading preventing agent in the present invention.

Here, a singlet oxygen quenching mechanism by a pentavalent phosphoric ester compound is described with reference to FIG. 1.

Excited singlet oxygen, which forms the cause of image fading, is formed by energy transfer between a coloring material such as a dye, which is brought in a triplet excited state by light and triplet oxygen in the ground state. Since the singlet oxygen thus formed has high reaction activity, it immediately reacts with the colorant as it is to oxidize the colorant and to form a decomposed colorant (image fading phenomenon, colorant degradation).

When the pentavalent phosphoric ester compound and the coloring material are present together, it is considered that the pentavalent phosphoric ester compound interacts with excited singlet oxygen faster than the rate of a reaction between the excited singlet oxygen and the colorant through a competitive reaction, and so the excited singlet oxygen is quenched into triplet oxygen in the ground state by an intramolecular proton transfer reaction.

Since the colorant is hard to be oxidized by the triplet oxygen in the ground state, the colorant comes to be protected from oxidation followed by image fading, in such a manner.

Such an image fading preventing agent intended to be provided in the present invention as to cause a suitable intramolecular proton transfer reaction was achieved by taking into consideration the presence of such a node of a wave function in an excited state as indicated by the broken line in the schemes (a) to (d) and electron systems of an intramolecular conjugated system participating in the proton transfer reaction. In other words, the feature of the image fading preventing agent according to the present invention resides in that it has a structure to cause intramolecular proton transfer, the number of double bonds forming a path of electron transfer attending on the intramolecular proton transfer is from 1 to 4, and no localized π electron system is contained in its molecule. Since the number of double bonds forming the electron transfer path is from 1 to 4, the range of the molecular resonance is short, the resonance path is limited, and the proton transfer takes place effectively in the molecule with low energy. Since the resonance path becomes complicated as the range of the molecular resonance becomes long, lowering of the proton transfer rate and lowering of the singlet-oxygen-quenching ability are caused with increasing excitation energy. In the present invention, the number of double bonds forming the path of electron transfer attending on the intramolecular proton transfer is preferably from 2 to 4. In the present invention, the number of electron systems participating in the proton transfer reaction is preferably from 2 to 8, most preferably from 4 to 6 from the viewpoint of the resonance range.

As compounds functioning as an image fading preventing agent due to the mechanism by the intramolecular proton transfer, benzotriazole compounds, which are ultraviolet light absorbers, are mentioned in Patent Document 3. The resonance formula of an intramolecular proton transfer reaction of a benzotriazole compound is shown below.

(e)

The benzotriazole compound has 6 double bonds forming a path of electron transfer attending on the intramolecular proton transfer as shown in the above scheme, and the range of the intramolecular resonance is long. Therefore, the intramolecular resonance requires higher excitation energy such as ultraviolet light than the compound short in the range of the intramolecular resonance according to the present invention. The compound long in the range of the intramolecular resonance is also slow in the rate of intramolecular proton transfer reaction, and so the singlet oxygen quenching mechanism by the intramolecular proton transfer reaction mechanism does not function, and energy excited by ultraviolet light is only deactivated into heat by proton transfer. Such a compound is considered to be oxidized in itself by singlet oxygen before the singlet oxygen is quenched. Therefore, it is considered that this kind of image fading preventing agent cannot maintain its effect.

As described above, the proton transfer reaction is a reaction repeatedly caused reversibly without undergoing its own oxidation reaction. As for this mechanism with which the quenching reaction is reversibly repeated, the compound that acquired energy from the singlet oxygen is considered to undergo proton transfer and thermally deactivate its energy due to a difference in stability from each other to return to its original state. Therefore, the image fading preventing agent using the proton transfer mechanism is considered to semipermanently maintain its effect.

The image fading preventing agent according to the present invention is a compound having the structure permitting intramolecular proton transfer as described above. The structure permitting intramolecular proton transfer has the ability of taking energy from singlet oxygen to quench the singlet oxygen by the proton transfer. From such a point of view, the compound is preferably in a dissolved state in a recording medium, or becomes a state capable of capturing energy from singlet oxygen by water entering the recording medium to dissolve the compound.

The image fading preventing agent is preferably a colorless or white compound. A compound having great resonance like, for example, β-carotin, has 11 double bonds which are easy to be oxidized by singlet oxygen and have a low oxidation potential (sacrificial reagent-like ability) in its molecule (according to a literature, β-carotin is described as having a singlet oxygen quenching rate of $1.0 \times 10^{10}$ $dm^3 mol^{-1} s^{-1}$). However, its singlet oxygen quenching mechanism is not a mechanism characterized by intramolecular proton transfer, but a chemical quenching mechanism in which localized double bonds possessed by the compound itself are oxidized and degraded. Therefore, 11 places functioning as the chemical quenching mechanism make the compound itself very unstable. Since the compound having such great resonance thus develops a red color or the like, it cannot be used as a material for obtaining a recording medium having high whiteness. Incidentally, the white compound means a compound having no molecular orbital system absorbing a visible region. The colorless compound means a compound the size of the molecule of which is of the degree of the wavelength of visible light or smaller in a liquid state or dispersed state.

When the image fading preventing agent is water-insoluble or alcohol-insoluble, there is a possibility that the degradation of a dye caused by singlet oxygen may not be directly prevented, because such an agent is dispersed with a surfactant or the like to be added to a coating liquid for an ink-receiving layer. There is also a possibility that the proton transfer mechanism may be inhibited by an interaction with the surfactant to develop no sufficient singlet-oxygen-quenching ability. Even when the image fading preventing agent is water-insoluble or alcohol-insoluble, the degradation of a coloring material caused by singlet oxygen can be directly prevented by providing an ink-receiving layer and then overcoating it with a solution with the image fading preventing agent dissolved in a solvent. In this case, it is considered that the singlet-oxygen-quenching ability is lowered. In addition, such a process is not so preferred from the viewpoints of increase of production steps and environmental burden.

When the image fading preventing agent is water-soluble or alcohol-soluble, the degradation of a coloring material caused by singlet oxygen can be directly prevented, because it can be directly added into a coating liquid for an ink-receiving layer. For such a reason, the image fading preventing agent is more preferably water-soluble or alcohol-soluble. Incidentally, a water-soluble or alcohol-soluble compound means a compound having a solubility of 0.1% by mass or more with respect to water or alcohol.

The singlet oxygen quenching rate ($k_{Q1}$) of the image fading preventing agent as measured by a competitive reaction method in ethanol is preferably from $3.0 \times 10^8$ $dm^3mol^{-1}s^{-1}$ to $9.0 \times 10^{10}$ $dm^3mol^{-1}s^{-1}$. The image fading preventing agent having such a singlet oxygen quenching rate can effectively prevent discoloration/fading of an image formed on a recording medium. If the singlet oxygen quenching rate is lower than $3.0 \times 10^8$ $dm^3mol^{-1}s^{-1}$, it is difficult to attain a sufficient singlet oxygen quenching effect. If the singlet oxygen quenching rate exceeds $9.0 \times 10^{10}$ $dm^3mol^{-1}s^{-1}$, such a compound is hard to attain sufficient stability.

In the present invention, the singlet oxygen quenching rate ($k_Q$ $dm^3mol^{-1}s^{-1}$) indicates the number of molecules of singlet oxygen quenched per second with a solution having a concentration of 1 mol/l. There are some theories, models, measuring methods and calculating methods as to this value, and researches have been already made and published in literature and the like. The singlet oxygen quenching mechanism strongly studied to date is mainly a singlet oxygen quenching mechanism characterized by an oxidation reaction (electron abstraction). With respect to oxidation reactions and electron transfer models, as the singlet oxygen quenching mechanism to date, some measuring methods and theories are published in literature, for example, SINGLET OXYGEN (1979) edited by Harry H. Wasserman, Robert W. Murray, Chapter 5, "Quenching of Singlet Oxygen". In many of these methods, the measurement is conducted in a non-aqueous solvent.

However, the singlet oxygen quenching rate $k_Q$ measured in a non-aqueous solvent is hard to reflect the function in an actual recorded article especially in ink-jet recording using a dye as a coloring material. Therefore, it is important to conduct the measurement in an aqueous solution or a solution of an alcohol such as ethanol.

Since the lifetime of singlet oxygen in water is $(5 \pm 2) \times 10^5$ $dm^3$ $mol^{-1}s^{-1}$, it is said that the measurement of a compound having a $k_Q$ value of $1 \times 10^6$ $dm^3mol^{-1}K^{-1}$ or higher may be suitably conducted. In the present invention, the singlet oxygen quenching rate ($k_Q$) of the singlet oxygen quenching agent was measured in accordance with the method described in the preprint of "The 22nd Oxidation Reaction Forum," page 7 (Ehime University, Faculty of Science, Mukai, Ohhaba, et al.). More specifically, the measurement was conducted by a method in which singlet oxygen is generated from 3-(1,4-epodioxyl-4-methyl-1,4-dihydro-1-naphthyl)propionic acid (EP) synthesized in accordance with a process described in Tetrahedron 41, 2177-2181 (1985), Inoue, et al. in an ethanol solvent at 35° C., 2,5-diphenyl-3,4-benzofuran (DPBF) is used as a reference substance for quenching, a substance to be measured and this reference substance are caused to coexist, both substances are caused to competitively react to the singlet oxygen, and the change in absorbance with time at the absorption wavelength of DPBF ($\lambda$max 411 nm) is traced by a spectrophotometer, thereby measuring the singlet oxygen quenching rate ($k_Q$) (this method is referred to as "a competitive reaction method"). Hereinafter, the singlet oxygen quenching rate shown in this description is a value measured in accordance with this method.

Incidentally, the singlet oxygen quenching mechanism includes a chemical quenching rate ($k_r$) with which a quenching compound reacts with singlet oxygen and becomes an oxide to conduct quenching, and a physical quenching rate ($k_q$) with which singlet oxygen is converted to triplet oxygen without reaction. The singlet oxygen quenching rate ($k_Q$) generally includes both quenching rates.

The image fading preventing agent according to the present invention develops, as a singlet oxygen quenching mechanism, only a physical quenching mechanism with which energy is taken from singlet oxygen to quench the singlet oxygen by proton transfer, whereby the relation of trade-off to the lastingness of the effect that a higher effective compound is an unstable compound easier to undergo oxidation in itself has been solved to lead to completion of a recording medium that can stably exhibit a high image fading preventing function over a long period of time to retain the image quality, as well as an image fading preventing agent used therein, and an image forming method.

In the present invention, the following conditions are preferably satisfied. Namely, in the present invention, in order to prevent a coloring material contained in an ink from undergoing discoloration/fading, a coloring material whose chemical quenching rate ($k_{r2}$) is dominant as the singlet oxygen quenching rate ($k_{Q2}$) of the coloring material is not a so preferred mode, because the chemical quenching rate ($k_{r2}$) is accompanied by such a change in molecular structure that the coloring material itself is degraded, i.e., discolored/faded, by oxidation reaction, so that there is a possibility of being out of the object of the present invention. Accordingly, it is the most preferred mode that the singlet oxygen quenching rate ($k_{Q2}$) is unlimitedly close to the physical quenching rate ($k_q$). When the proportion of the chemical quenching rate ($k_{r2}$) of the singlet oxygen quenching rate ($k_{Q2}$) of the coloring material is not higher than 10%, the shelf life of an image becomes better. When the proportion is higher than 10%, however, contribution of the chemical quenching becomes great, and the oxidation reaction of the coloring material itself is great, so that a problem may be caused in terms of the degree of image fading. More specifically, when image formation with a coloring material is conducted on a recording medium containing an image fading preventing agent having a singlet oxygen quenching rate ($k_{Q1}$) higher than that of the singlet oxygen quenching rate ($k_{Q2}$) of the coloring material in the present invention, the image fading preventing agent is preferentially oxidized by singlet oxygen, so that the fading prevention of the image of the coloring material becomes feasible. However, when the chemical quenching rate ($k_{r2}$) of the singlet oxygen quenching rate ($k_{Q2}$) of the coloring material is dominant, the coloring material is oxidized irrespective of the value of the singlet oxygen quenching rate ($k_{Q1}$) of the image fading preventing agent. As a result, discoloration/fading may be caused in some cases.

It is only necessary for such an image fading preventing agent according to the present invention as described above to have in its molecule a functional group which causes intramolecular proton transfer. Examples thereof include anthraquinone derivatives, pentavalent phosphoric ester compounds, unsaturated cycloalkyl compounds and unsaturated aliphatic compounds.

Among these, the pentavalent phosphoric ester compounds and anthraquinone derivatives are preferred. Since the pentavalent phosphoric ester compounds and anthraquinone derivatives are high in singlet oxygen quenching rate ($k_{Q1}$), the effect of the present invention is great. The pentavalent phosphoric ester compound to be an image fading preventing agent according to the present invention is preferably selected from compounds having a structure represented by the following formula (1) or (2).

(1)

In the formula (1), $R^1$ to $R^3$ are, independently of one another, a hydrogen atom, an aliphatic alkyl group, an aromatic alkyl group or a (meth)acryloyloxyalkyl group, with the proviso that one or two of $R^1$ to $R^3$ are hydrogen atoms. A compound in which one of $R^1$ to $R^3$ is a hydrogen atom, i.e., a pentavalent phosphoric ester compound having one free OH, is preferred.

(2)

In the formula (2), $R^4$ to $R^7$ are, independently of one another, a hydrogen atom, an aliphatic alkyl group, an aromatic alkyl group or a (meth)acryloyloxyalkyl group, with the proviso that one, two or three of $R^4$ to $R^7$ are hydrogen atoms. A compound in which one or two of $R^4$ to $R^7$ are hydrogen atoms is preferred. In the case of a compound in which two of $R^4$ to $R^7$ are hydrogen atoms, a compound in which one of $R^4$ and $R^5$ is a hydrogen atom and one of $R^6$ and $R^7$ is a hydrogen atom is preferred.

Examples of an aliphatic alkyl group which may be preferably selected in the formula (1) or (2) include alkyl groups having 1 to 24 carbon atoms, such as methyl, ethyl and propyl groups. Examples of an aromatic alkyl group include phenyl, phenylmethyl, toluyl, naphthyl and naphthylmethyl groups. Examples of a (meth)acryloyloxy-alkyl group include alkyl groups having an acryloyloxy group or a (meth)acryloyloxy group. These groups may be either linear or branched.

Specific examples of the pentavalent phosphoric ester compound represented by the formula (1) include the following compounds.

$(C_2H_5O)_nP(O)(OH)_{3-n}$ $(C_4H_9O)_nP(O)(OH)_{3-n}$ $(C_8H_{17}O)_nP(O)(OH)_{3-n}$ $(C_{12}H_{25}O)_nP(O)(OH)_{3-n}$ $(C_{18}H_{37}O)_nP(O)(OH)_{3-n}$ $(C_{24}H_{49}O)_nP(O)(OH)_{3-n}$

$(CH_2{=}C(CH_3)COOC_2H_4O)_nP(O)(OH)_{3-n}$

Incidentally, n is 1 or 2.

Specific examples of the pentavalent phosphoric ester compound represented by the formula (2) include the following compound.

$(C_4H_9O)P(O)(OH)_2$

The anthraquinone derivative to be an image fading preventing agent according to the present invention is great in the effect of the present invention. The anthraquinone derivative to be an image fading preventing agent according to the present invention is preferably selected from compounds having a structure represented by the following formula (3) or (4).

(3)

The formula (3) is a structural formula of a compound having one structure to cause proton transfer in its molecule. In the formula (3), $R^1$ to $R^7$ are preferably, independently of one another, a hydrogen atom, an aliphatic alkyl group or an aromatic alkyl group. Since these substituent groups affect the balance of the basicity of the ketone substituted or the acidity of the hydroxyl group, they affect the rate of a proton transfer reaction, and thus affect the singlet oxygen quenching rate. Accordingly, it is necessary to suitably select the substituent groups in view of this circumstance. In the structure of the formula (3), an ester group or a hydroxyl group may be specifically substituted, independently of each other, at positions of $R^4$ and $R^5$. By being substituted at these positions, the compound becomes a compound, which causes two kinds of proton transfer reactions of a keto-enol type and an ester-hydroxyl group type at the same time. Therefore, such a compound is more preferred.

(4)

The formula (4) is a structural formula of a compound having two structures to cause proton transfer in its molecule. In the formula (4), $R^1$ to $R^6$ are preferably, independently of one another, a hydrogen atom, an aliphatic alkyl group or an aromatic alkyl group. Since these substituent groups affect the balance of the basicity of the ketone substituted or the acidity of the hydroxyl group, they affect the rate of the proton transfer reaction, and thus affect the singlet oxygen quenching rate. Accordingly, it is necessary to suitably select the substituent groups in view of this circumstance.

(Recording Medium)

Figure 2:
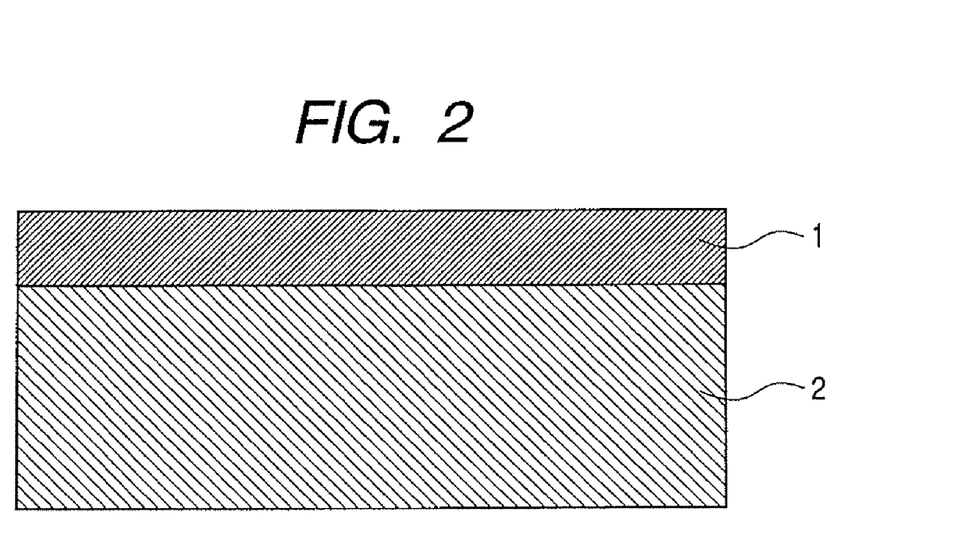
FIG. 2 is a cross-sectional view illustrating the construction of a recording medium according to the present invention.

The recording medium according to the present invention is a recording medium comprising a base material 2 and an ink-receiving layer 1 formed as a coloring material receiving region on the base material 2 as shown in FIG. 2. The above-described image fading preventing agent according to the present invention is contained in the ink-receiving layer 1. With such a recording medium, discoloration/fading of an image formed thereon can be prevented to stably retain the image quality for a long period of time. The recording medium is particularly suitable for use in ink-jet recording.

For the base material 2, may be used a base paper produced by means of various paper machines such as a Fourdrinier paper machine, a cylinder paper machine and a twin-wire former, by using, as a main component, wood pulp, such as chemical pulp such as LBKP or NBKP, mechanical pulp such as GP, PGW, RMP, TMP, CTMP, CMP or CGP, or waste paper pulp such as DIP, or synthetic fiber pulp such as polyethylene fibers, and mixing at least one of various kinds of additives generally used in paper making, such as a pigment, a sizing agent, a fixing agent, a yield improver and a paper-strength improving agent, as needed. Further, a processed paper obtained by subjecting the above-mentioned base paper to the size press coating with starch, polyvinyl alcohol or the like or by providing an anchor coating layer thereon, or coated paper obtained by providing a coating layer thereon, such as art paper, coat paper or cast coated paper, may also be used. Incidentally, the ink-receiving layer 1 may be directly provided on such paper, or a calender machine such as a machine calender, TG calender or soft calender may also be used in a stage prior to the coating of the ink-receiving layer 1 for the purpose of improving the smoothness of the surface of the base material 1 to achieve good recording properties and glossiness as an ink-jet recording paper.

As the base material 2, may also be used that obtained by providing a resin layer on the above-described paper. As the resin layer, may be used a film of a synthetic resin such as polyethylene, polypropylene, polyester, nylon, rayon or polyurethane or a mixture thereof, or a formed sheet obtained by processing the above-mentioned synthetic resin into fibers and forming the fibers into the sheet.

The above-described image fading preventing agent according to the present invention is contained in the ink-receiving layer 1 formed on the base material 2. One kind of image fading preventing agent may be used, or two or more kinds of image fading preventing agents may be used in combination. The content of the image fading preventing agent in the ink-receiving layer 1 is preferably within a range of from 0.1% by mass or more to 10.0% by mass or less based on the whole solid content of the ink-receiving layer 1. If the content is lower than 0.1% by mass, sufficient weatherability may not be achieved in some cases. On the other hand, a content exceeding 10.0% by mass may cause troubles in image recording properties in some cases in that lowering of OD and/or lowering of ink absorbency at a half tone or secondary color portion occurs. Items considered to be influence on the image recording properties due to the addition of the image fading preventing agent herein include a feeling of graininess, deep and light shade of an image density, color brightness, blurring of a fine line, etc. A more preferable range of the content of the image fading preventing agent is from 2.5% by mass or more to 6.0% by mass or less. When the content of the image fading preventing agent falls within this range, the balance between weatherability and image recording properties becomes much excellent, so that the influence on the image recording properties due to the addition of the image fading preventing agent becomes negligible while imparting sufficient weatherability. Therefore, a very satisfactory image is provided.

The amount of the image fading preventing agent contained in the ink-receiving layer 1 is preferably controlled in such a manner that the content per unit area of the resulting recording medium amounts to from $1.00 \times 10^{-4}$ mol/m$^2$ or more to $1.00$ mol/m$^2$ or less. When the content of the image fading preventing agent per unit area falls within this range, sufficient weatherability is achieved and excellent image recording properties that do not cause lowering of OD and/or lowering of ink absorbency at a half tone or secondary color portion are attained. The content is more preferably from $5 \times 10^{-4}$ mol/m$^2$ or more to $1 \times 10^{-2}$ mol/m$^2$ or less.

The image fading preventing agent is preferably caused to exist in a state where the image fading preventing agent can function so as to enable it to capture energy from singlet oxygen in the recording medium, i.e., in a state where energy can be taken from the singlet oxygen. For example, the image fading preventing agent is caused to exist as solid or crystal in the recording medium, or as microcapsules including the image fading preventing agent dissolved in an oily substance. Alternatively, the image fading preventing agent may be caused to exist in any other various states. However, merely containing the image fading preventing agent in the recording medium may fail to effectively capture energy from singlet oxygen in some cases. In other words, in order to make the image fading preventing agent into a sufficiently functioning state, the image fading preventing agent is preferably in a dissolved state in the recording medium, or becomes a state capable of capturing energy from singlet oxygen by entering the recording medium to be dissolved. In the case of a recording medium used in ink-jet recording in particular, the image fading preventing agent becomes a dissolved state when an ink composition, which is a coloring material, is ejected to fill the recording medium with the ink liquid mainly comprising water, and so becomes a state capable of efficiently capturing energy from singlet oxygen.

The ink-receiving layer 1 generally contains a pigment and a binder in addition to the image fading preventing agent.

As the pigment used herein, is particularly preferred that comprising alumina hydrate as a main component from the viewpoints of dye fixing ability, transparency, printing density, color developability and glossiness. However, the following pigments may also be used. Examples of inorganic pigments include precipitated calcium carbonate, heavy calcium carbonate, magnesium carbonate, kaolin, aluminum silicate, diatomaceous earth, calcium silicate, magnesium silicate, synthetic amorphous silica, colloidal silica, alumina and magnesium hydroxide. As examples of organic pigments, may be mentioned styrene plastic pigments, acrylic plastic pigments, polyethylene particles, microcapsule particles, urea resin particles and melamine resin particles. One is chosen for use from these pigments, or two or more thereof may be used in combination as needed.

As the above pigment, a fine particle pigment having an average particle size of 1 μm or smaller is preferably used as a main component. Fine particles of the silica type or aluminum oxide type are particularly preferred. As the silica type fine particles, are preferred fine silica particles typified by commercially available colloidal silica. As particularly preferred silica type fine particles, may be mentioned those disclosed in, for example, Japanese Patent Nos. 2803134 and 2881847. As preferred aluminum oxide type fine particles, may be mentioned fine particles of alumina hydrate. Incidentally, the alumina hydrate is that represented by, for example, the following general formula.

(In the formula, n is any of 0, 1, 2 and 3, and m is a number ranging from 0 to 10, preferably from 0 to 5. However, m and n are not 0 at the same time. In many cases, $mH_2O$ represents a water phase, which does not participate in the formation of a crystal lattice, but is detachable. Therefore, m may take a value of an integer or a value other than the integer. When this kind of material is heated, m may reach a value of 0.)

The alumina hydrate can be generally produced in accordance with the publicly known process such as hydrolysis of an aluminum alkoxide or sodium aluminate (U.S. Pat. Nos. 4,242,271 and 4,202,870), or a process in which an aqueous solution of aluminum sulfate, aluminum chloride or the like is added to an aqueous solution of sodium aluminate to conduct neutralization (Japanese Patent Publication No. S 57-44605).

Alumina hydrate preferred in the present invention is an alumina hydrate showing a boehmite structure or amorphous structure when analyzed by X-ray diffractometry, and the alumina hydrates described in Japanese Patent Application Laid-Open Nos. H07-232473, H08-132731, H09-066664 and H09-076628, and the like are particularly preferred.

In order to impart gloss to the surface of the ink-jet recording medium according to the present invention by a rewet casting method, the ink-receiving layer 1 that is dried and formed is often wetted again to conduct a casting process, so that flat plate-like alumina hydrate little in the tendency to orient upon the formation of the ink-receiving layer 1 and good in water absorption property is preferably used. In other words, since the flat plate-like alumina hydrate is good in water absorption property, a liquid (water) for rewetting is easy to be penetrated, so that the ink-receiving layer 1 is easy to be wetted, and re-orientation of the alumina hydrate particles is easy to occur. Accordingly, high glossiness can be achieved in the casting process. In addition, since the liquid for rewetting efficiently penetrates, production efficiency of the casting process also becomes high.

The content of the pigment in the ink-receiving layer 1 is preferably within a range of from 55.0% by mass or more to 94.0% by mass or less based on the whole solid content of the ink-receiving layer 1.

As the binder, may be used conventionally known binders, such as polyvinyl alcohol or modified products thereof, starch or modified products thereof, gelatin or modified products thereof, casein or modified products thereof, gum arabic, cellulose derivatives such as carboxymethyl cellulose, hydroxyethyl cellulose and hydroxypropylmethyl cellulose, NBR latexes and methyl methacrylate-butadiene copolymers, conjugated diene copolymer latexes such as SBR latexes, functional-group-modified polymer latexes, vinyl copolymer latexes such as ethylene-vinyl acetate copolymers, polyvinyl pyrrolidone, maleic anhydride polymers or copolymers thereof, and acrylic ester copolymers. In the present invention, polyvinyl alcohol is preferably used as the binder, and a conventionally known binder is also preferably used in combination with polyvinyl alcohol. The amount of the binder incorporated is preferably controlled to from 5% by mass or more to 20% by mass or less based on the pigment.

It is extremely effective from the viewpoint of the formation of the ink-receiving layer 1 to contain one or more boric compounds as a crosslinking agent in the raw materials for forming the ink-receiving layer 1 formed in the above-described manner. As the boric compound usable in this case, may be used not only orthoboric acid ($H_3BO_3$), but also metaboric acid, hypoboric acid or the like. Salts thereof may also be used. The boric acid salt is preferably a water-soluble salt of any of the above-described boric acids. As specific examples thereof, may be mentioned alkali metal salts such as the sodium salts ($Na_2B_4O_7.10H_2O$, $NaBO_2.4H_2O$, etc.) and the potassium salts ($K_2B_4O_7.5H_2O$, $KBO_2$, etc.) of boric acid, the ammonium salts ($NH_4B_4O_9.3H_2O$, $NH_4B_4O_9$, etc.) of boric acid, and alkaline earth metal salts such as the magnesium salts and the calcium salts of boric acid. Orthoboric acid or a salt thereof is preferably used from the viewpoints of shelf life of the resulting coating liquid and an effect of inhibiting the occurrence of cracks.

The amount of the boric compound used is preferably within a range of from 1.0% by mass or more to 15.0% by mass or less based on the binder in the ink-receiving layer 1. If the amount is outside the above range, the shelf life of the resulting coating liquid may be lowered in some cases. Even if the amount falls within this range, it is considered that cracks may occur in some cases according to other production conditions. In such case, the amount may be suitably controlled. If the amount exceeds the above range, the shelf life of the resulting coating liquid may be lowered in some cases. In other words, upon production, the coating liquid is used over a long period of time, so that when the amount of boric acid is large, increase in the viscosity of the coating liquid or occurrence of a gelled product may be caused. Therefore, refilling of the coating liquid or cleaning of a coater head is frequently required, so that productivity may be markedly lowered in some cases. In addition, if the amount exceeds the above range, dotted surface (cast surface) defects are easy to occur upon the casting process, so that an uniform and good glossy surface may not be obtained in some cases.

To the ink-receiving layer 1, other additives than such components as described above may also be added as needed. As examples of the other additives, may be mentioned dispersants, thickeners, pH adjustors, lubricants, flowability modifiers, surfactants, antifoaming agents, parting agents, optical whitening agents, ultraviolet light absorbers and antioxidants.

As for a method for forming the ink-receiving layer 1 containing the image fading preventing agent on the base material 2, it is simple and convenient to apply a solution of the image fading preventing agent obtained by dissolving the image fading preventing agent in an organic solvent or the like on to the ink-receiving layer 1 formed by other components than the image fading preventing agent in advance. Such a method permits the image fading preventing agent to be contained in a greater amount on the surface side of the ink-receiving layer 1.

No particular limitation is imposed on the organic solvent used for preparing the solution of the image fading preventing agent. However, for example, esters such as ethyl acetate and butyl acetate, ketones such as methyl isobutyl ketone, methyl ethyl ketone and acetone, ethers such as diethyl ether and ethyl methyl ether, and alcohols such as isopropanol, methanol and ethanol are preferred. Incidentally, when the image fading preventing agent is soluble in water, water, preferably deionized water, may be used as the solvent. The concentration of the image fading preventing agent in the solution of the image fading preventing agent is desirably controlled to 0.5% by mass or more to 30% by mass or less in that the resulting coating liquid is easy to be applied.

The coating method of the image fading preventing agent is preferably a non-contact method in which the surface of the ink-receiving layer 1 is coated with the image fading preventing agent by means of a die coater, air knife coater or sprayer from the viewpoint of the appearance of the finished ink-jet recording medium. However, a contact coating method by a roll coater, bar coater, gravure coater or the like may also be used.

When the ink-receiving layer 1 containing a boric compound is formed, a base material 2 the surface of which has been wetted with a tetraboric acid salt in advance is preferably used, because bonding between the base material 2 and the ink-receiving layer 1 can be strengthened, and so the degree of freedom in the setting of the thickness of the ink-receiving layer 1 is increased.

The image fading preventing agent may also be applied in the form of a coating liquid containing all components by adding it to a coating liquid containing the raw materials of the ink-receiving layer 1.

The dry coating weight of the ink-receiving layer 1 is preferably 30 g/m$^2$ or higher taking high ink absorbency into consideration, and more preferably 60 g/m$^2$ or lower. If the dry coating weight is smaller than 30 g/m$^2$, sufficient ink absorbency may not be achieved in some cases, namely, ink overflowing may occur to cause bleeding, or a dye in an ink may diffuse up to the base material 2 to lower a print density, when the resulting recording medium is used in a printer to which a plurality of light shade inks and a black ink are added in addition to 3 color inks of cyan, magenta and yellow. If the dry coating weight exceeds 60 g/m$^2$ on the other hand, there is a possibility that the occurrence of cracking may not be prevented. When the dry coating weight is not smaller than 30 g/m$^2$, the resulting ink-receiving layer 1 exhibits sufficient ink absorbency even under a high-temperature and high-humidity environment. Thus, such a dry coating weight is preferred. When the dry coating weight is not greater than 60 g/m$^2$, the resulting ink-receiving layer 1 is hard to cause coating unevenness, whereby an ink-receiving layer 1 having a stable thickness can be produced. Thus, such a dry coating weight is more preferred.

With respect to the ink-receiving layer 1 formed in the above-described manner, the pore physical properties thereof preferably satisfy the following conditions from the viewpoint of achieving the objects and effects such as high ink absorbency and high fixing ability.

First, the pore volume of the ink-receiving layer 1 is preferably within a range of from 0.1 cm$^3$/g or more to 1.0 cm$^3$/g or less. In other words, if the pore volume is smaller than the lower limit of the above range, sufficient ink-absorbing performance is not achieved, and the resulting ink-receiving layer 1 is poor in ink absorbency. In some cases, there may be a possibility that ink overflowing may occur to cause bleeding on an image. If the pore volume exceeds the upper limit of the above range on the other hand, the resulting ink-receiving layer 1 is apt to easily cause cracking and powdery coming-off. The specific surface area of the ink-receiving layer 1 is preferably within a range of from 20 m$^2$/g or more to 450 m$^2$/g or less. If the specific surface area is smaller than the lower limit of the above range, sufficient glossiness may not be achieved in some cases. In addition, there is a possibility that "white haze" may appear on an image because haze is increased (transparency is lowered). In this case, there is also a possibility that the ability to adsorb a dye in an ink may be lowered. Thus, the specific surface area smaller than the lower limit is not preferred. If the specific surface area exceeds the upper limit of the above range on the other hand, such an ink-receiving layer 1 is easy to cause cracking. Thus, the specific surface area exceeding the upper limit is not preferred. Incidentally, the pore volume and BET specific surface area can be determined by the nitrogen adsorption and desorption method.

After the ink-receiving layer 1 is formed in the above-described manner, a glossy surface may be formed on the surface of the ink-receiving layer 1 by a casting process.

The casting process is a process wherein an ink-receiving layer 1 in a wetted state or in a state having plasticity is brought into close contact under pressure with a heated specular drum (cast drum) and dried in this pressure contact condition to copy the specular surface from the drum on the surface of the ink-receiving layer 1. Typical processes thereof include 3 processes of a direct process, a rewet process (indirect process) and a solidification process.

Any of these casting processes may be used. However, the use of the rewet casting process is preferred because alumina hydrate is preferably used in the ink-receiving layer 1 of the ink-jet recording medium in the present invention, and in this case, high glossiness can be achieved on the surface of the ink-receiving layer by this process.

(Image Forming Method)

The image forming method according to the present invention will now be described. The image forming method according to the present invention is a method comprising forming an image with a coloring material on the recording medium described above. By such an image forming method, the discoloration/fading of the image formed on the recording medium can be prevented to retain the image quality thereof over a long period of time. This method is particularly suitable as an image forming process with an ink-jet recording system. Ink compositions preferably usable in the image forming method according to the present invention will hereinafter be described.

(Ink Composition)

An ink composition as an ink used in the image forming method according to the present invention comprises a coloring material, and a preferred mode is an ink composition comprising a coloring material, water and a water-soluble organic solvent.

No particular limitation is imposed on the coloring material contained in the ink composition. However, a water-soluble dye is preferably used, and examples thereof include those classified in COLOR INDEX into acid dyes, direct dyes, catalytic dyes, reactive dyes, soluble vat dyes, sulfur dyes and food colors. Specifically, azo, anthraquinone or anthrapyridone type dyes, or the like may be used. The content of the coloring material in the ink composition is preferably from 0.1% by mass or more to 20% by mass or less, more preferably from 1% by mass or more to 5% by mass or less.

In particular, when a coloring material that is considered to have singlet-oxygen-quenching ability in itself is used, the image fastness properties of the resulting image are markedly improved. From such a point of view, the singlet oxygen quenching rate of the coloring material is preferably from $1.0 \times 10^8$ dm$^3$mol$^{-1}$s$^{-1}$ or more to $3.0 \times 10^{10}$ dm$^3$mol$^{-1}$s$^{-1}$ or less. High singlet-oxygen-quenching ability is achieved by the molecular structure thereof, the state of an electron within the molecule, the quenching mechanism characterized by energy relaxation caused by proton transfer, and the substitution of a site to be oxidized having an anti-oxidizing function.

The relation between the coloring material contained in the ink composition used in recording and the image fading preventing agent contained in the recording medium will now be described. When an image is formed with a coloring material on a recording medium containing an image fading preventing agent having a singlet oxygen quenching rate higher than that of the singlet oxygen quenching rate of this coloring material, the image fading preventing agent is preferentially oxidized by singlet oxygen, so that the image fading preventing function of the coloring material is easy to be developed. However, it is considered that complicated factors, which cannot be easily quantified, are contained due to the influence of whether the image fading preventing agent in the recording medium is uniformly distributed or not and whether the coloring material in the ink composition is uniformly fixed to the ink-receiving layer or not in the case of ink-jet recording.

That aspect has been investigated in detail. As a result, it has been found that it is preferable that the singlet oxygen quenching rates of the coloring material used in recording and the image fading preventing agent contained in the recording medium satisfy the following expression (I)

$$k_{Q1} \geq 3.0 k_{Q2} \quad (I)$$

wherein $k_{Q1}$ (dm$^3$mol$^{-1}$s$^{-1}$): singlet oxygen quenching rate of the image fading preventing agent, $k_{Q2}$ (dm$^3$mol$^{-1}$s$^{-1}$): singlet oxygen quenching rate of the coloring material.

Further, detailed investigations including a preferable range of the content of the image fading preventing agent in the ink-receiving layer and a preferable range of the content of the coloring material to be shot by recording in the recording medium have been made. As a result, it has been found that it is preferable to satisfy the following expression (II) in order to effectively develop the image fading preventing function of the image fading preventing agent.

$$K_{Q1} X \geq k_{Q2} Y \quad (II)$$

wherein $k_{Q1}$ (dm$^3$mol$^{-1}$s$^{-1}$): singlet oxygen quenching rate of the image fading preventing agent, Y (mol/m$^2$): content of the coloring material per unit area, $k_{Q2}$ (dm$^3$mol$^{-1}$s$^{-1}$): singlet oxygen quenching rate of the coloring material, X (mol/m$^2$): content of the image fading preventing agent per unit area.

It is preferable to select the coloring material according to the kind of the image fading preventing agent contained in recording medium taking the above-described points into consideration. Alternatively, it is preferable to select the image fading preventing agent contained in the recording medium to be used according to the kind of the coloring material.

Incidentally, when a plurality of image fading preventing agents are contained in the recording medium, it is only necessary for the one having the maximum singlet oxygen quenching rate out of the plurality of the image fading preventing agents to satisfy the above expressions. Besides, when a plurality of coloring materials are shot in the recording medium, it is only necessary for the one having the maximum singlet oxygen quenching rate out of the plurality of coloring materials to satisfy the above expressions.

As the water-soluble organic solvent, is preferably used a water-soluble, high-boiling and low-volatile organic solvent. Specific preferable examples of the water-soluble, high-boiling and low-volatile organic solvent include polyhydric alcohols and lower alkyl ethers of polyhydric alcohols. More specifically, alkylene glycols such as ethylene glycol, diethylene glycol, triethylene glycol and propylene glycol; glycerol; polyalkylene glycol such as polyethylene glycol and polypropylene glycol; lower alkyl ethers of polyhydric alcohols, such as ethylene glycol monomethyl (or ethyl) ether, diethylene glycol monomethyl (or ethyl) ether and triethylene glycol monomethyl (or ethyl) ether; and lower dialkyl ethers of polyhydric alcohols, such as triethylene glycol dimethyl (or ethyl) ether are mentioned. The alkylene group preferably has 2 to 6 carbon atoms. These organic solvents may be used singly or may also be used in a combination of two or more compounds thereof. The amount of these water-soluble, high-boiling and low-volatile organic solvents added may be suitably determined. It is however preferable to add them in such a manner that the content in the ink composition falls within a range of, for example, from 5% by mass or more to 35% by mass or less. The reason for it is that these solvents left in a print may form the cause of the blurring of an image during storage by absorbing moisture in the air.

Examples of other water-soluble organic solvents usable to the ink composition include amides such as dimethylformamide and dimethylacetamide; ketones or ketone alcohols such as acetone and diacetone alcohol; ethers such as tetrahydrofuran; alkyl alcohols having 1 to 5 carbon atoms, such as methyl alcohol, ethyl alcohol, n-propyl alcohol and n-butyl alcohol; and sulfolane, pyrrolidone, N-methyl-2-imidazolidinone, 1,5-pentanediol, 1,2-hexanediol and 1,2-pentanediol. These organic solvents may be used singly or may also be used in a combination of two or more compounds thereof. The amount of these organic solvents added may be suitably determined. It is however preferable to add them in such a manner that the content in the ink composition falls within a range of, for example, from 5% by mass or more to 35% by mass or less. The ink composition according to the present invention may also contain acetylene glycol as a water-soluble organic solvent. As acetylene glycol, may be used a commercially available product. For example, Surfinol 82, 104, 440, 465 and TG, and Olfine STG (all, trade names, manufacturer: Air Product and Chemicals Inc., seller: Nisshin Chemical Industry Co., Ltd.) may be used. The amount of acetylene glycol added may be suitably determined. It is however preferable to add it in such a manner that the content in the ink composition falls within a range of, for example, from 0.3% by mass or more to 1.8% by mass or less.

According to a preferable mode of the water-soluble organic solvent contained in the ink composition according to the present invention, a lower alkyl ether of a polyhydric alcohol and acetylene glycol may be used in combination. The combined use of these solvents permits the ink composition applied to the recording medium to immediately penetrate to effectively prevent the deterioration of print quality caused by color mixing between adjoining dots, or the like, which often poses a problem in color ink-jet recording.

The content of the water-soluble organic solvents is preferably controlled within a range of from 1% by mass or more to 40% by mass or less, more preferably from 3% by mass or more to 30% by mass or less, based on the whole mass of the ink composition. The content of water in the ink composition is preferably within a range of from 30% by mass or more to 95% by mass or less for the purpose of improving the solubility of a dye as the coloring material in the ink composition, imparting a sufficient viscosity to stably eject the ink composition and effectively preventing the occurrence of clogging at an orifice.

Besides the above components, various additives such as surfactants, pH adjustors, rust preventives, preservatives, mildewproofing agents, antioxidants, reduction-preventing agents, evaporation accelerators, chelating agents and water-soluble polymers may be contained in each ink composition used in the present invention, as needed.

When each ink composition used in the present invention is prepared, moisture-retaining solids such as urea, urea derivatives and trimethylolpropane may be used as a component for the ink composition for the purpose of maintaining the moisture retention of the ink composition. The amount of the moisture-retaining solids, such as urea, urea derivatives and trimethylolpropane, added to the ink composition is desirably within a range of preferably from 1 to 30% by mass, more preferably from 3% by mass or more to 20% by mass or less. The amount of the surfactant added is desirably within a range of preferably from 0.01 to 10% by mass, more preferably from 0.05 to 3% by mass.

With respect to the physical properties of the ink composition, the viscosity, surface tension and pH thereof are as follows (all, determined at 25° C.). The viscosity is preferably within a range of from 1.5 cps or more to 10 cps or less, more preferably from 1.8 cps or more to 5.0 cps or less. The surface tension is preferably within a range of from 25 dyn/cm or more to 45 dyn/cm or less. The pH is preferably within a range of from 6 to 9.

(Image Forming Element and Image)

An image forming element comprising a coloring material and a compound having in its molecule a functional group to cause intramolecular proton transfer is obtained in the above-described manner. Further, an image formed thereby is obtained.

EXAMPLES

The present invention will hereinafter be described in more detail by the Examples and Comparative Examples. However, the present invention is not limited to these examples.

<Measurement of Singlet Oxygen Quenching Rate ($k_Q$)>

The singlet oxygen quenching rates of the coloring material and image fading preventing agent were measured under the following conditions in accordance with the above-described competitive reaction method. Ethanol was used as a solvent for measurement to prepare a solution in which a singlet oxygen generating agent [3-(1,4-epodioxyl-4-methyl-1,4-dihydro-1-naphthyl)propionic acid (EP)] adjusted to $1 \times 10^{-3}$ M, a reference substance [2,5-diphenyl-3,4-benzofuran (DPBF)] for quenching which was adjusted to $1 \times 10^{-3}$ M, and a substance to be measured (a coloring material or image fading preventing agent) which was adjusted to $1 \times 10^{-5}$ M are present together. The solution was heated to 35° C., thereby generating singlet oxygen from EP to conduct a competitive reaction to quench the singlet oxygen by DPBF and the substance to be measured. With respect to the temporal change of the absorbance at the known absorption wavelength of DPBF ($\lambda_{max}$=411 nm) in the absence of the substance to be measured, the temporal change of the absorbance at the wavelength of 411 nm in the presence of the substance to be measured was traced by a spectrophotometer, thereby measuring the singlet oxygen quenching rate.

<Synthesis of Coloring Material>

As coloring materials used in Examples and Comparative Examples, were synthesized Coloring Material A and Coloring Material B having the following respective structures. Specifically, a publicly known anthrapyrodone dye was used as a raw material to synthesize each coloring material in accordance with a synthetic flow of methylation -> bromination-> acylation-> cyclization reaction-> Ullmann reaction-> sulfonation. As a reaction reagent for acylation, an acid anhydride or an ester was used, and the cyclization reaction was conducted by a method in which a dehydration reaction is conducted under high-temperature and high-pressure conditions (120° C. to 160° C. and 2 atm or higher) in the presence of an alkali. When the group substituted on the pyridone ring in the sulfonation was an acetyl group, an aqueous solution of sodium hydroxide was used as a neutralization reagent. When the group was an acetoacyl group, an aqueous solution of sodium carbonate was used as a neutralization reagent for the purpose of preventing an acetoacetyl group from being hydrolized. As the starting material, was used bromoanthrapyridone (product of Yamada Chemical Co., Ltd.) that is an industrial product.

Coloring Material A (molecular weight: 742)

Coloring Material B (molecular weight: 468)

The singlet oxygen quenching rates ($k_Q$) of Coloring Materials A and B were measured in accordance with the above-described competitive reaction method, and the $k_Q$ values thus obtained are shown in Table 1.

<Preparation of Ink Composition>

Ink Compositions A and B used in Examples and Comparative Examples were prepared in the following manner.

| | |
|---|---|
| Coloring material (Coloring Material A or B) | 6 parts by mass |
| Diethylene glycol | 5 parts by mass |
| Glycerol | 10 parts by mass |
| Acetylenol EH (product of Kawaken Fine Chemicals Co., Ltd.) | 1 part by mass |
| Ion-exchanged water | 78 parts by mass. |

The above composition was mixed, and the resultant mixed liquid was filtered under pressure through a membrane filter having a pore size of 0.2 μm to obtain Ink Compositions A and B for ink-jet recording containing Coloring Material A or B, respectively.

<Image Fading Preventing Agent>

Image fading preventing agents having the following structures A, B, C, D and E, respectively, were provided as image fading preventing agents used in Examples and Comparative Examples.

(Image Fading Preventing Agent A)

Aloesaponarin I (having a structure permitting intramolecular proton transfer; white powder at ordinary temperature; easily soluble in water)

Image fading preventing agent A (molecular weight: 299)

(Image Fading Preventing Agent B)

Aloesaponarin II (having a structure permitting intramolecular proton transfer; white powder at ordinary temperature; easily soluble in water)

Image fading preventing agent B (molecular weight: 313)

(Image Fading Preventing Agent C)

Pentavalent phosphoric ester compound (product of JOHOKU CHEMICAL CO., LTD.; trade name: JP-506)

(having a structure permitting intramolecular proton transfer; liquid at ordinary temperature; easily soluble in water)

Image fading preventing agent C (molecular weight: 154)

(Image Fading Preventing Agent D)

Trivalent phosphorous ester compound (triphenyl phosphate) (having no structure permitting intramolecular proton transfer; white powder at ordinary temperature; insoluble in water)

Image fading preventing agent D (molecular weight: 262)

(Image Fading Preventing Agent E)

Sodium azide (having no structure permitting intramolecular proton transfer; colorless crystal at ordinary temperature; easily soluble in water)

Image fading preventing agent E (molecular weight: 65)

$NaN_3$

The singlet oxygen quenching rates ($k_Q$) of the image fading preventing agents A, B, C, D and E were measured in accordance with the above-described competitive reaction method, and the $k_Q$ values thus obtained are shown in Table 1.

<Preparation of Ink-Jet Recording Medium>

(Recording Medium 1)

A base material is first prepared in the following manner. After 0.60 part by mass of cationized starch (product of Daiwa Kagaku Kogyo K.K., trade name: Soldine CP-13D), 10 parts by mass of heavy calcium carbonate, 15 parts by mass of light calcium carbonate, 0.10 part by mass of an alkyl ketene dimer (product of Arakawa Chemical Industries, Ltd., trade name: Sizepine K903), 0.03 part by mass of cationic polyacrylamide ((product of Arakawa Chemical Industries, Ltd., trade name: Polystron 619), and 0.40 part by mass of aluminum sulfate (product of Showa Chemical Industry Co., Ltd.) were added to a pulp slurry composed of 80 parts by mass of Laulholz (deciduous) bleached kraft pulp (LBKP) having a freeness of 450 ml CSF (Canadian Standard Freeness) and 20 parts by mass of Nadelholz (coniferous) bleached kraft pulp (NBKP) having a freeness of 480 ml CSF to prepare a stuff, a paper was made by means of a Fourdrinier paper machine, subjected to 3-stage wet pressing and dried by means of a multi-cylinder dryer. After the resultant paper was then impregnated with an aqueous solution of oxidized starch (product of NIHON SHOKUHIN KAKO CO., LTD., trade name: MS-3800) by means of a size press so as to give a solid content of 1.0 g/m², and dried, the paper was finished by a machine calender to obtain a base material having a basis weight of 155 g/m², a Stöckigt sizing degree of 100 seconds, an air permeability of 50 seconds, a Bekk smoothness of 30 seconds and a Gurley stiffness of 11.0 mN.

An undercoating layer was then formed on the base material obtained above in the following manner. As a coating liquid used for forming the undercoating layer, a composition was first obtained by adding 7 parts by mass of a commercially available styrene-butadiene latex (product of JSR Corporation, trade name: T-2418C) to a slurry that is composed of 100 parts by mass of a filler composed of kaolin (trade name: Ultrawhite 90, product of Engelhard Co.)/zinc oxide/aluminum hydroxide (mass ratio: 65/10/25), and 0.1 part by mass of a commercially available polyacrylic acid type dispersant (product of Toagosei Chemical Industry Co., Ltd., trade name: Aron T-40) and has a solid content concentration of 70% by mass and then adjusting the concentration so as to give a solid content of 60% by mass. This composition was then applied to both surfaces of the base material by a blade coater so as to give a dry coating weight of 15 g/m² and dried. Thereafter, the thus-treated base material was finished by a machine calender (linear pressure: 150 kgf/cm) to obtain a undercoating-layer-carrying base material having a basis weight of 185 g/m², a Stöckigt sizing degree of 300 seconds, an air permeability of 3,000 seconds, a Bekk smoothness of 200 seconds and a Gurley stiffness of 11.5 mN. The whiteness degree of the undercoating-layer-carrying base material was determined with the average value by measuring it on five A4-sized samples obtained by cutting the base material. As a result, it was found to be L: 95, a*: 0 and b*: −2 (determined as a hue prescribed in JIS Z 8729).

An aqueous solution of a tetraboric acid salt (that obtained by dissolving borax in a purified water and adjusting the solution so as to give a solid content concentration of 5.0% by mass) was then applied on to one surface of the base material having the undercoating layers on both surfaces thereof so as to give a solid content of 0.5 g/m², and an ink-receiving layer was formed as soon as the undercoating layer was impregnated with the coating liquid. The coating liquid and the coating method used in the formation of the ink-receiving layer at this time are as follows.

Sodium aluminate was added to a 4% by mass aqueous solution of aluminum chloride to adjust the pH of the mixture to 4. Thereafter, the mixture was heated to 90° C. with stirring, and stirring was continued for a while. Thereafter, sodium aluminate was added again to adjust the pH to 10, and an aging reaction was conducted for 40 hours while retaining the temperature. The temperature of the reaction mixture was then returned to room temperature, and the pH was adjusted to not lower than 7 and not higher than 8 with acetic acid. The thus-obtained liquid dispersion was subjected to a desalting treatment and then to a peptizing treatment with acetic acid to obtain a colloidal sol. This colloidal sol of alumina hydrate was concentrated to obtain a solution having a solid content concentration of 17% by mass. On the other hand, polyvinyl alcohol (trade name: PVA 177, product of Kuraray Co., Ltd.) was dissolved in purified water to obtain a 9% by mass solution. The colloidal sol of alumina hydrate and the polyvinyl alcohol solution were mixed and stirred in such a manner that solid contents of the alumina hydrate and polyvinyl alcohol amount to 10:1 in terms of mass ratio, thereby obtaining a liquid dispersion. This liquid dispersion was applied at 30 m/min by a die coater so as to give a dry coating weight of 35 g/m². The liquid dispersion was then dried at 170° C. to form the ink-receiving layer, thus obtaining Ink-Jet Recording Medium 1. At this time, this Recording Medium 1 was found to have an average pore radius of 8.5 nm and a pore volume of 0.65 ml/g from BET measurement.

(Recording Medium 2)

After a 5% by mass MIBK (methyl isobutyl ketone) solution of Image fading preventing agent A was applied on to the ink-receiving layer of Ink-Jet Recording Medium 1 by a roll coater, the excess portion of the solution was scraped out by a Meyer bar to conduct coating at 60 m/min so as to give a coating weight of $1.00 \times 10^{-3}$ mol/m² in terms of solid content. Within 5 seconds after the coating, the solution was dried at 110° C. Thereafter, the surface of the ink-receiving layer was subjected to a rewet casting treatment with hot water by means of a rewet cast coater to obtain Ink-Jet Recording Medium 2.

(Recording Medium 3)

After a 5% by mass MIBK solution of Image fading preventing agent A was applied on to the ink-receiving layer of Ink-Jet Recording Medium 1 by a roll coater, the excess portion of the solution was scraped out by a Meyer bar to conduct coating at 60 m/min so as to give a coating weight of $1.00 \times 10^{-2}$ mol/m² in terms of solid content. Within 5 seconds after the coating, the solution was dried at 110° C. Thereafter, the surface of the ink-receiving layer was subjected to a rewet casting treatment with hot water by means of a rewet cast coater to obtain Ink-Jet Recording Medium 3.

(Recording Medium 4)

After a 5% by mass MIBK solution of Image fading preventing agent A was applied on to the ink-receiving layer of Ink-Jet Recording Medium 1 by a roll coater, the excess portion of the solution was scraped out by a Meyer bar to conduct coating at 60 m/min so as to give a coating weight of $1.00 \times 10^{-1}$ mol/m² in terms of solid content. Within 5 seconds after the coating, the solution was dried at 110° C. Thereafter, the surface of the ink-receiving layer was subjected to a rewet casting treatment with hot water by means of a rewet cast coater to obtain Ink-Jet Recording Medium 4.

(Recording Medium 5)

After a 5% by mass MIBK solution of Image fading preventing agent B was applied on to the ink-receiving layer of Ink-Jet Recording Medium 1 by a roll coater, the excess portion of the solution was scraped out by a Meyer bar to conduct coating at 60 m/min so as to give a coating weight of $1.00 \times 10^{-2}$ mol/m² in terms of solid content. Within 5 seconds after the coating, the solution was dried at 110° C. Thereafter, the surface of the ink-receiving layer was subjected to a rewet casting treatment with hot water by means of a rewet cast coater to obtain Ink-Jet Recording Medium 5.

(Recording Medium 6)

After a 5% by mass MIBK solution of Image fading preventing agent C was applied on to the ink-receiving layer of Ink-Jet Recording Medium 1 by a roll coater, the excess portion of the solution was scraped out by a Meyer bar to conduct coating at 60 m/min so as to give a coating weight of $1.00 \times 10^{-3}$ mol/m² in terms of solid content. Within 5 seconds after the coating, the solution was dried at 110° C. Thereafter, the surface of the ink-receiving layer was subjected to a rewet casting treatment with hot water by means of a rewet cast coater to obtain Ink-Jet Recording Medium 6.

(Recording Medium 7)

After a 5% by mass MIBK solution of Image fading preventing agent D was applied on to the ink-receiving layer of Ink-Jet Recording Medium 1 by a roll coater, the excess portion of the solution was scraped out by a Meyer bar to conduct coating at 60 m/min so as to give a coating weight of $1.00 \times 10^{-2}$ mol/m² in terms of solid content. Within 5 seconds after the coating, the solution was dried at 110° C. Thereafter, the surface of the ink-receiving layer was subjected to a rewet casting treatment with hot water by means of a rewet cast coater to obtain Ink-Jet Recording Medium 7.

(Recording Medium 8)

After a 5% by mass MIBK solution of Image fading preventing agent E was applied on to the ink-receiving layer of Ink-Jet Recording Medium 1 by a roll coater, the excess portion of the solution was scraped out by a Meyer bar to conduct coating at 60 m/min so as to give a coating weight of $1.00 \times 10^{-1}$ mol/m² in terms of solid content. Within 5 seconds after the coating, the solution was dried at 110° C. Thereafter, the surface of the ink-receiving layer was subjected to a rewet casting treatment with hot water by means of a rewet cast coater to obtain Ink-Jet Recording Medium 8.

(Recording Medium 9)

Ink-Jet Recording Medium 9 was produced in the same manner as in Ink-Jet Recording Medium 1 except that the composition of the coating liquid for forming the ink-receiving layer was changed. The preparation of the coating liquid for forming the ink-receiving layer will hereinafter be described.

Sodium aluminate was added to a 4% by mass aqueous solution of aluminum chloride to adjust the pH of the mixture to 4. Thereafter, the mixture was heated to 90° C. with stirring, and stirring was continued for a while. Thereafter, sodium aluminate was added again to adjust the pH to 10, and an aging reaction was conducted for 40 hours while retaining the temperature. The temperature of the reaction mixture was then returned to room temperature, and the pH was adjusted to not lower than 7 and not higher than 8 with acetic acid. The thus-obtained liquid dispersion was subjected to a desalting treatment and then to a peptizing treatment with acetic acid to obtain a colloidal sol. This colloidal sol of alumina hydrate was concentrated to obtain a solution having a solid content concentration of 17% by mass. On the other hand, polyvinyl alcohol (trade name: PVA 177, product of Kuraray Co., Ltd.) was dissolved in purified water to obtain a 9% by mass solution. The colloidal sol of alumina hydrate and the polyvinyl alcohol solution were mixed and stirred in such a manner that solid contents of the alumina hydrate and polyvinyl alcohol amount to 10:1 in terms of mass ratio, and Image fading preventing agent C was further added to this liquid dispersion in such a manner that the content amounts to 4.4% by mass based on 100 of the total solid content of the liquid dispersion, thereby obtaining a liquid dispersion. This liquid dispersion was applied at 30 m/min by a die coater so as to give a dry coating weight of 35 g/m². The liquid dispersion was then dried at 170° C. to form the ink-receiving layer, thus obtaining Ink-Jet Recording Medium 9. At this time, Ink-Jet Recording Medium 9 was found to have an average pore radius of 8.6 nm and a pore volume of 0.67 ml/g from BET measurement. At this time, the amount of Image fading preventing agent C applied to the ink-receiving layer of Ink-Jet Recording Medium 9 was $1.00 \times 10^{-2}$ mol/m².

Examples 1 to 9

Comparative Examples 1 to 6

Ink-jet recording was conducted with Ink Composition A or B prepared above by means of an ink-jet printer (trade name: iP8600, manufactured by Canon Inc.). Ink-Jet Recording Media 1 to 9 produced above were used as ink-jet recording media to conduct printing on a region having a size of 1.0 cm×1.0 cm under control of printing duty to prepare samples for a fluorescent lamp test. Since the amount of the ink ejected at this time was 19.5 g/m², and the concentration of the dye was 6.0% by mass as described above, the dye comes to be ejected in an amount of 1.17 g/m² in terms of solid content.

The combinations of the ink composition and ink-jet recording method used are as shown in Table 2.

<Conditions and Evaluating Method of Fluorescent Lamp Test>

As a discoloration/fading test for confirming the effects of the present invention, a 600-hour accelerated light fastness test was conducted under temperature and humidity conditions of 30° C. and 50% RH with a cool white fluorescent lamp of 60,000 lux. As an evaluating method, the optical density of the samples before and after the accelerated test was measured at every elapsed time of 200 hours by means of a densitometer to determine the density retention rate of the dye in accordance with the following equation (A). The results are shown collectively in Table 2.

$$\text{Density retention rate (\%)} = (D/D_0) \times 100 \quad (A)$$

D: optical density after the accelerated light fastness test, $D_0$: optical density before the accelerated light fastness test.

TABLE 1

| Sample | Singlet oxygen quenching rate $k_Q$ (dm³mol⁻¹s⁻¹) |
|---|---|
| Coloring Material A | $6.36 \times 10^8$ |
| Coloring Material B | $1.06 \times 10^8$ |
| Image fading preventing agent A | $7.26 \times 10^8$ |
| Image fading preventing agent B | $4.11 \times 10^8$ |
| Image fading preventing agent C | $1.18 \times 10^8$ |
| Image fading preventing agent D | $2.00 \times 10^7$ |
| Image fading preventing agent E | $2.20 \times 10^8$ |

TABLE 2

| | Ink-jet recording medium | | | Ink composition | | | Evaluation result of fluorescent lamp test | | |
|---|---|---|---|---|---|---|---|---|---|
| | | Image fading preventing agent | | | Coloring material | | Density retention rate (%) | | |
| No. | | Kind | $K_{Q1}$ (dm³mol⁻¹s⁻¹) | $X \cdot k_{Q1}$ (dm³mol⁻¹s⁻¹) | Kind | $K_{Q2}$ (dm³mol⁻¹s⁻¹) | $Y \cdot k_{Q2}$ (dm³mol⁻¹s⁻¹) | After 200 hrs | After 400 hrs | After 600 hrs |
| EX. 1 | 2 | A | $7.26 \times 10^8$ | $7.26 \times 10^5$ | A | $6.36 \times 10^8$ | $1.00 \times 10^6$ | 94 | 90 | 79 |
| EX. 2 | 3 | A | $7.26 \times 10^8$ | $7.26 \times 10^6$ | A | $6.36 \times 10^8$ | $1.00 \times 10^6$ | 95 | 92 | 83 |
| EX. 3 | 3 | A | $7.26 \times 10^8$ | $7.26 \times 10^6$ | B | $1.06 \times 10^8$ | $2.65 \times 10^5$ | 93 | 88 | 85 |
| EX. 4 | 4 | A | $7.26 \times 10^8$ | $7.26 \times 10^7$ | A | $6.36 \times 10^8$ | $1.00 \times 10^6$ | 96 | 94 | 85 |
| EX. 5 | 5 | B | $4.11 \times 10^8$ | $4.11 \times 10^6$ | A | $6.36 \times 10^8$ | $1.00 \times 10^6$ | 94 | 90 | 81 |
| EX. 6 | 5 | B | $4.11 \times 10^8$ | $4.11 \times 10^6$ | B | $1.06 \times 10^8$ | $2.65 \times 10^5$ | 91 | 86 | 72 |
| EX. 7 | 6 | C | $1.18 \times 10^8$ | $1.18 \times 10^5$ | B | $1.06 \times 10^8$ | $2.65 \times 10^5$ | 88 | 82 | 70 |
| EX. 8 | 9 | C | $1.18 \times 10^8$ | $1.18 \times 10^6$ | A | $6.36 \times 10^8$ | $1.00 \times 10^6$ | 92 | 88 | 79 |
| EX. 9 | 9 | C | $1.18 \times 10^8$ | $1.18 \times 10^6$ | B | $1.06 \times 10^8$ | $2.65 \times 10^5$ | 90 | 84 | 71 |
| Comp. EX. 1 | 1 | — | — | — | A | $6.36 \times 10^8$ | $1.00 \times 10^6$ | 89 | 79 | 62 |
| Comp. EX. 2 | 1 | — | — | — | B | $1.06 \times 10^8$ | $2.65 \times 10^5$ | 78 | 64 | 51 |
| Comp. EX. 3 | 7 | D | $2.00 \times 10^7$ | $2.00 \times 10^5$ | A | $6.36 \times 10^8$ | $1.00 \times 10^6$ | 88 | 74 | 59 |
| Comp. | 7 | D | $2.00 \times 10^7$ | $2.00 \times 10^5$ | B | $1.06 \times 10^8$ | $2.65 \times 10^5$ | 79 | 65 | 53 |

TABLE 2-continued

| | | Ink-jet recording medium | | Ink composition | | | Evaluation result of fluorescent lamp test | | |
| | | Image fading preventing agent | | Coloring material | | | Density retention rate (%) | | |
| No. | Kind | $K_{Q1}$ (dm$^3$mol$^{-1}$s$^{-1}$) | $X \cdot k_{Q1}$ (dm$^3$mol$^{-1}$s$^{-1}$) | Kind | $K_{Q2}$ (dm$^3$mol$^{-1}$s$^{-1}$) | $Y \cdot k_{Q2}$ (dm$^3$mol$^{-1}$s$^{-1}$) | After 200 hrs | After 400 hrs | After 600 hrs |
|---|---|---|---|---|---|---|---|---|---|
| EX. 4 | | | | | | | | | |
| Comp. EX. 5 | 8 | E | $2.20 \times 10^8$ | $2.20 \times 10^7$ | A | $6.36 \times 10^8$ | $1.00 \times 10^6$ | 89 | 75 | 60 |
| Comp. EX. 6 | 8 | E | $2.20 \times 10^8$ | $2.20 \times 10^7$ | B | $1.06 \times 10^8$ | $2.65 \times 10^5$ | 74 | 60 | 50 |

As described above, it has been found that according to the present invention, the discoloration/fading of an image formed on the recording medium can be efficiently prevented, and the effects can also be expected over a long period of time, and consequently the image quality of the image can be stably retained over a long period of time.

The image fading preventing agents, image forming elements, recording media, image forming method and images according to the present invention can be widely utilized not only in an ink-jet recording system, but also in image forming techniques such as a dye sublimation thermal transfer system, an electrophotographic system and offset printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-159239, filed May 31, 2005 which is hereby incorporated by reference herein in its entirety.

What is claimed is:

1. A recording medium comprising:
   a base material; and
   a coloring material receiving region formed on the base material,
   wherein an anthraquinone derivative is contained in the coloring material receiving region as an image fading preventing agent.

2. The recording medium according to claim 1, wherein the content of the image fading preventing agent per unit area is from $1.00 \times 10^{-4}$ mol/m$^2$ or more to 1.00 mol/m$^2$ or less.

3. The recording medium according to claim 1, which is used for ink-jet recording.

4. An image forming method comprising forming an image on the recording medium according to claim 1 with a coloring material.

5. The image forming method according to claim 4, wherein the coloring material has a singlet oxygen quenching rate of from $1.0 \times 10^8$ dm$^3$mol$^{-1}$s$^{-1}$ or more to $3.0 \times 10^{10}$ dm$^3$mol$^{-1}$s$^{-1}$ or less as measured by a competitive reaction method in ethanol.

6. The image forming method according to claim 4, wherein a singlet oxygen quenching rate of the image fading preventing agent as measured by a competitive reaction method in ethanol $k_{Q1}$ (dm$^3$mol$^{-1}$s$^{-1}$), a content of the image fading preventing agent per unit area of the recording medium X (mol/m$^2$), a singlet oxygen quenching rate of the coloring material used in recording as measured by the competitive reaction method in ethanol $k_{Q1}$ (dm$^3$mol$^{-1}$s$^{-1}$), and a content of the coloring material per unit area of the recording medium upon recording with an ink composition containing the coloring material Y (mol/m$^2$) satisfy the following expression (II):

$$K_{Q1}X \geq k_{Q2}Y \qquad (II).$$

7. The image forming method according to claim 4, wherein the image is formed by an ink-jet recording system.

8. The recording medium according to claim 1, wherein the anthraquinone derivative has a structure represented by the following formula (3) or (4), (3)

wherein, in the formula (3), $R^1$ to $R^7$ are, independently of one another, a hydrogen atom, an aliphatic alkyl group or an aromatic alkyl group, and (4)

wherein, in the formula (4), $R^1$ to $R^6$ are, independently of one another, a hydrogen atom, an aliphatic alkyl group or an aromatic alkyl group.

* * * * *